Oct. 4, 1938.  M. A. SAVAGE  2,132,274
DYNAMO-ELECTRIC MACHINE
Filed June 24, 1936
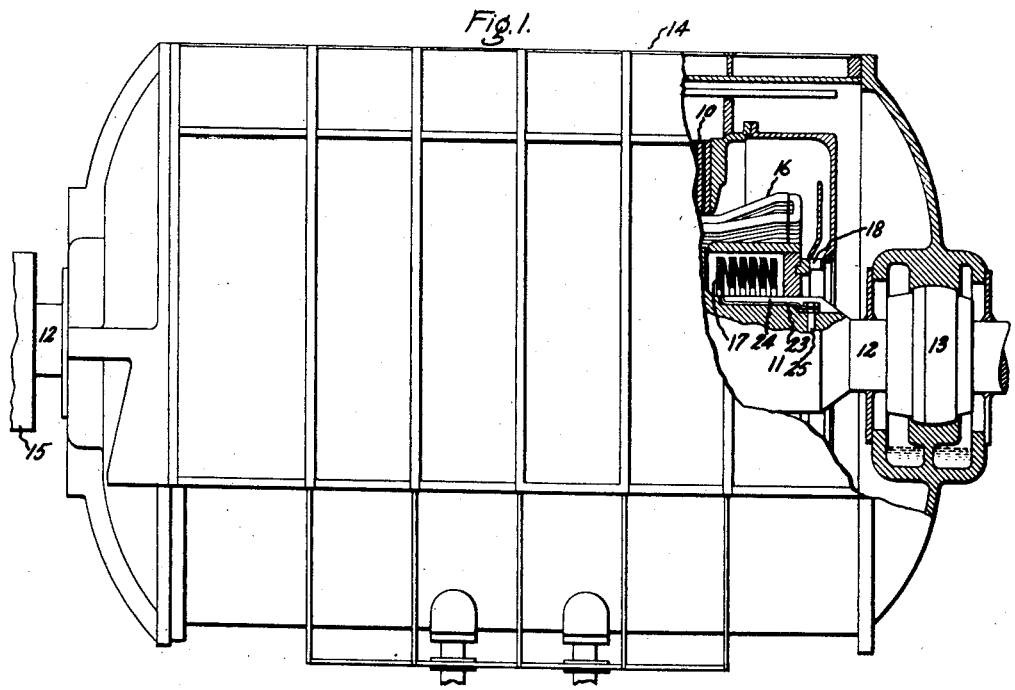
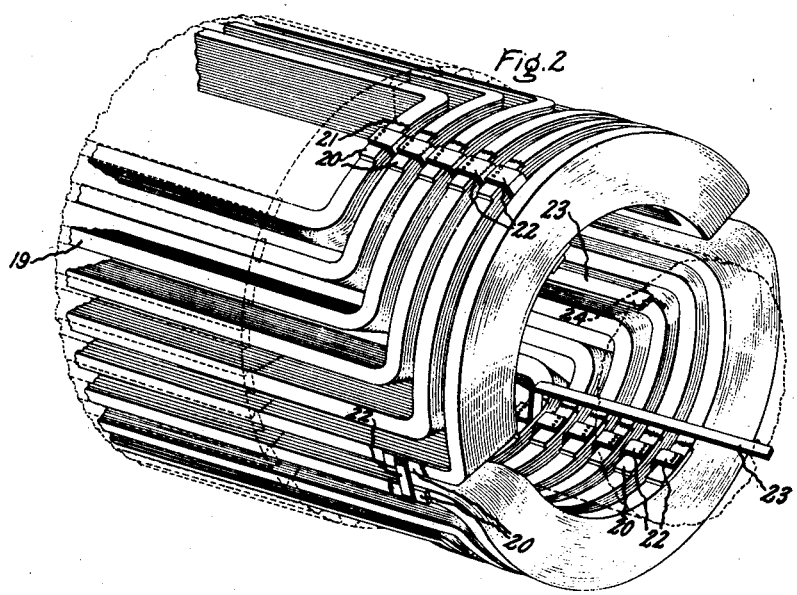
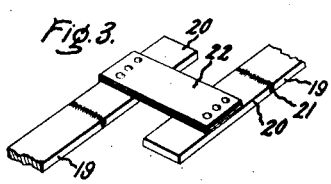
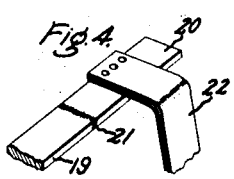
Inventor:
Marion A. Savage,
by Harry E. Dunham
His Attorney.

Patented Oct. 4, 1938

2,132,274

UNITED STATES PATENT OFFICE 2,132,274

DYNAMO-ELECTRIC MACHINE

Marion A. Savage, Scotia, N. Y., assignor to General Electric Company, a corporation of New York Application June 24, 1936, Serial No. 86,965

8 Claims. (Cl. 171—252)

My invention relates to dynamo-electric machines.

It is an object of my invention to provide a dynamo-electric machine of great electrical capacity which is particularly suited for high speed operation. I accomplish this result by using an aluminum winding in the rotatable member of a dynamo-electric machine cooled by hydrogen, or a gas consisting mainly of hydrogen.

In order effectively to use an aluminum winding for this purpose, it is necessary to provide a satisfactory means for making connections to the aluminum winding and between the coils forming the winding. It is consequently a further object of my invention to provide means for connecting coils of aluminum to form a winding and for connecting the winding thus formed into an electrical circuit. I accomplish this object by welding terminals of cupreous material to the aluminum winding or to the coils of a winding and make connections with these terminals through cupreous conductors which are attached thereto by riveting or a similar mechanical means.

For a better understanding of my invention, reference may be had to the following description taken in connection with the accompanying drawing in which Fig. 1 is a side view with parts broken away illustrating a dynamo-electric machine embodying my invention; Fig. 2 is a perspective view of an end portion of the winding for the rotatable member, the winding being formed of aluminum coils connected together and into an electrical circuit in accordance with my invention; and Figs. 3 and 4 are detail views showing the particular assemblies by means of which these connections are made.

The dynamo-electric machine illustrated in the drawing comprises a stationary member 10 which surrounds a rotatable member 11 having a shaft 12 which is mounted in bearings 13 located in the ends of a housing 14 completely enclosing the machine. This housing is adapted to contain a cooling gas such as hydrogen or a gas consisting mainly of hydrogen. The dynamo-electric machine may be the generator of a turbo-generator set, the turbine shaft being connected at 15 to the left-hand end of the shaft of the rotatable member 11. The stationary member 10 and the rotatable member 11 are provided with windings 16 and 17 arranged in slots in these members and constituting the armature and field windings respectively of the dynamo-electric machine illustrated. Fans 18 located on the ends of the rotatable member 11 circulate the cooling gas through the machine and suitable coolers by means of a duct system located within the housing or forming a part thereof.

The coils 19 of the windings 17 in the rotatable member 11 are made of aluminum. Experience has indicated that the most satisfactory way of connecting coils into a winding and attaching conductors to the terminals of windings thus formed is through the use of a mechanical and electrical joint formed by riveting and soldering the parts together. A mechanical union between aluminum members is, however, subject to corrosion which not only weakens the joint mechanically, but increases its electrical resistance. Furthermore, connectors of aluminum, which, due to their location, are subjected to mechanical stresses occurring at their points of attachment, must be made much larger than required for electrical purposes due to the low tensile strength of aluminum. When connectors of a cupreous material are mechanically attached to and used to join aluminum coils into a winding and to connect the terminals of the winding into an electrical circuit, the corrosion between these members becomes excessive due to the electrolytic action occurring at the joint.

I, therefore, provide the ends of each aluminum winding coil with terminals 20 of copper or cupreous material which are attached thereto at 21 by welding and connect these coils to form a winding by means of connectors 22 also formed of copper or cupreous material and attached to the terminals 20 of the coils 19 by riveting and soldering or a similar electrical joint. In the arrangement illustrated in the drawing the coils have been connected in series with one another and arranged to form a two-pole winding. The connectors are preferably of laminated construction in order to give them a certain amount of flexibility and thereby facilitate the connection of the coils into the winding. The cupreous terminals of the winding thus formed are connected into an electrical circuit through the agency of cupreous conductors 23 which are located in slots 24 in the right end portion of the rotatable member 11. These conductors are connected to cupreous conductors located in the spindle 12 through the agency of connection studs 25 of copper or cupreous material. The conductors in the spindle 12 are connected at their outer ends to collector rings mounted on the shaft 12. The conductors in the shaft 12 and the collector rings above referred to have not been shown in the drawing, but are in accordance with usual practice.

It is, of course, understood that the turns of each coil 19 are suitably insulated from one another and that these coils are insulated from the slots in the rotatable member 11 within which they are located. The connectors and conductors by means of which the terminals of the windings are connected to the slip rings are also suitably insulated.

Any suitable procedure may be employed by means of which the cupreous terminals 20 are welded to the ends of the aluminum coils 19. I prefer to employ the procedure developed by Robert T. Gillette which forms the subject matter of an application Serial No. 87,009, filed concurrently herewith for Method of resistance butt welding, and assigned to the General Electric Company, assignee of my present invention.

In accordance with this procedure, the ends of the parts to be welded are brought together with sufficient pressure to prevent arcing and spattering of metal at the joint between them when a welding current is passed through the joint, the ends of the parts are then brought to a welding temperature by passing welding current through them while maintaining this pressure, and the weld is completed by simultaneously interrupting the flow of welding current and pushing the parts together to force from between them all but a very thin layer of the copper-aluminum alloy formed during the welding operation.

By using an aluminum winding instead of a copper winding, the diameter of the rotatable member of the machine may be increased in size without causing it to operate with stresses that are greater than those used in rotatable members having copper windings, because the weight of the aluminum winding is much less than the weight of an equivalent copper winding. Furthermore, by causing the dynamo-electric machine to operate in an atmosphere of hydrogen, the "windage" losses will not be excessive and will in no way impair the operating efficiency of the machine even though the size of the rotatable member has been increased. Due to the increased size of the rotatable member and the exceptional quality of hydrogen as a cooling medium due not only to its high specific heat, but also due to its high heat conductivity, it is possible to employ greater current densities in the aluminum winding, and thus make the weight of the winding and the diameter of the rotatable member less than the weight and size that would seem to be necessary in view of the relative conductivity and relative density of aluminum to copper.

The increased diameter of the rotatable member, made possible by the use of an aluminum winding, imparts to the machine a very desirable characteristic which particularly adapts it for operation at high speeds when cooled by a hydrogen atmosphere. By high speeds I mean speeds of about 3,000 revolutions per minute or more. A particularly desirable operating speed for 60 cycle dynamo-electric machines is 3,600 revolutions per minute.

In order to reduce the stresses in the rotatable member of a dynamo-electric machine operating at high speeds, it has been necessary in the past, when using copper windings, to limit the diameter of the rotatable member and to increase the electrical capacity of the machine by increasing the length of its stationary and rotatable members. A rotatable member of small diameter and comparatively great length will have low critical speeds, that is, speeds where excessive vibration occurs. These critical speeds will be lower the greater the length of the rotatable member relative to its diameter. It is very desirable and in most cases absolutely necessary that the machine operate above the first critical speed and below the second critical speed of its rotatable member and this limitation greatly complicates the design of high speed dynamo-electric machines of large electrical capacity.

It is possible through the use of an aluminum winding in the rotatable member of a high speed machine of the hydrogen cooled type to proportion the diameter of its rotatable member relative to its length so that it will have the necessary stiffness to permit operations at high speeds, which are sufficiently removed from its critical speeds to insure operation of the machine without excessive vibration. By using an aluminum winding the diameter of the rotatable member may be made larger relative to its length than is possible in an electrically equivalent rotatable member having a copper winding and formed of like materials in which the operating stresses are of substantially the same magnitude. As a direct result of the lighter weight of the aluminum winding, the increased diameter of the rotatable member will not increase the centrifugal pressure on its winding insulation for the same speeds of operation, and this is of great importance in that it makes it possible to use known dielectric materials with safety in large sized machines having rotatable members operating at high speeds. Furthermore, by reason of the large diameter of the rotatable member made possible by the use of an aluminum winding, the output of the machine can be greatly increased since this varies directly as the length of the machine and the square of its diameter. By using hydrogen cooling the windage losses of the larger rotatable member are so low that the total losses of a machine for a given output may be reduced and the efficiency of the machine thus increased. It thus becomes apparent that by employing an aluminum winding in the rotatable member of a high speed hydrogen cooled machine it is possible to increase the electrical capacity of such machines and have them operate at higher efficiencies.

Although I have described a particular winding formed of aluminum coils connected with one another and into an electrical circuit in a particular manner, it is to be understood that in accordance with the broader aspects of my invention the aluminum winding may be formed in any suitable manner and will be productive of the advantages recited above which results from using such a winding in the rotatable member of a dynamo-electric machine cooled by hydrogen or gas consisting mainly of hydrogen.

It is also apparent that the winding in the stationary member of the machine may be formed of aluminum and embody the construction of the winding for the rotatable member described above.

What I claim as new and desire to secure by Letters Patent of the United States, is:

1. A high speed hydrogen cooled turbo-generator comprising a rotatable member adapted to operate at 3,000 or more revolutions per minute, an aluminum winding in said rotatable member and a housing about said rotatable member adapted to contain hydrogen, said rotatable member being larger in diameter relative to its length than an electrically equivalent rotatable member having a copper winding and formed of like materials in which the operating stresses are of substantially the same magnitude.

2. A high speed hydrogen cooled turbo-generator comprising a rotatable member having an operating speed of 3,000 or more revolutions per minute, an aluminum winding in said rotatable member, and a housing about said rotatable member adapted to contain hydrogen, said rotatable member being stiffened by proportioning its diameter relative to its length in accordance with increased diametrical limitations resulting from hydrogen cooling and the use of an aluminum winding so that its operating speed is removed from those speeds where excessive vibration occurs.

3. A dynamo-electric machine comprising a rotatable member, a winding in said rotatable member and a housing about said rotatable member adapted to contain hydrogen as a cooling gas, said winding being formed of aluminum and having terminals of cupreous material connected to one another and into an electrical circuit by cupreous conductors mechanically attached to said cupreous terminals.

4. A winding for dynamo-electric machines formed of coils made of aluminum and having terminals of cupreous material welded thereto, said coils being connected to form said winding by connection strips of cupreous material mechanically attached to the cupreous terminals of said coils.

5. A winding for dynamo-electric machines formed of coils made of aluminum and having terminals of cupreous material welded thereto, said coils being connected to form said winding by flexible laminated connection strips of cupreous material mechanically attached to the cupreous terminals of said coils.

6. A winding for dynamo-electric machines formed of coils made of aluminum and having terminals of cupreous material welded thereto, said coils being connected to form said winding by connection strips of cupreous material mechanically attached to the cupreous terminals of said coils, and said winding having connections of cupreous material mechanically attached to the cupreous terminals of two of said coils constituting the ends of said winding.

7. A winding coil for dynamo-electric machines made of aluminum and having terminals of cupreous metal welded thereto.

8. A winding for dynamo-electric machines formed of coils made of aluminum and having terminals of cupreous material welded thereto, said coils being connected to form said winding by electrical connections between said terminals.

MARION A. SAVAGE.